(12) United States Patent
Bangel et al.

(10) Patent No.: US 7,085,764 B2
(45) Date of Patent: Aug. 1, 2006

(54) SYSTEM, METHOD AND PROGRAM PRODUCT FOR CENTRALLY MANAGING AGENTS

(75) Inventors: Matthew J. Bangel, Owego, NY (US); David M. Filiberti, Fairfax, VT (US); William M. Houston, Williston, VT (US); James A. Martin, Jr., Endicott, NY (US); Eric J. Morin, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/144,640

(22) Filed: May 13, 2002

(65) Prior Publication Data

US 2003/0212715 A1    Nov. 13, 2003

(51) Int. Cl.
*G06F 17/30* (2006.01)
*G06F 15/16* (2006.01)
(52) U.S. Cl. .................. 707/10; 707/201; 709/202
(58) Field of Classification Search ............... 707/201, 707/204, 203, 10, 2; 709/202
See application file for complete search history.

(56) References Cited

U.S. PATENT DOCUMENTS

| | | | |
|---|---|---|---|
| 5,668,986 | A | 9/1997 | Nilsen et al. |
| 5,884,324 | A | 3/1999 | Cheng et al. |
| 6,009,275 | A | 12/1999 | DeKoning et al. |
| 6,219,675 | B1 | 4/2001 | Pal et al. |
| 6,615,223 | B1 * | 9/2003 | Shih et al. ............ 707/201 |
| 6,678,700 | B1 * | 1/2004 | Moore et al. .......... 707/200 |
| 6,728,713 | B1 * | 4/2004 | Beach et al. ........... 707/10 |
| 2001/0048665 | A1 | 12/2001 | Matsuura | |

FOREIGN PATENT DOCUMENTS

| | | |
|---|---|---|
| JP | 04157944 A | 5/1992 |
| JP | 2000250833 A | 9/2000 |
| WO | WO 00/52903 | 9/2000 |

OTHER PUBLICATIONS

Oracle7™ Server Distribution Systems, vol. II: Replicated Data, Release 7.3, Feb. 1996, Oracle®.*
Nikolaos Anerousis, "A Distributed Computing Environment for Building Scalable Management Services", AT & T Labs Research, http://www.research.att.com/-nikos, IEEE, pp. 547-562, Undated.
Feng Cao, Jeff Smith and Kenji Takahashi, "An Architecture of Distributed Media Servers for Supporting Guaranteed QoS and Media Indexing", IEEE, pp. 1-5, 1999.
Claude Le Pape, Robotics Laboratory, Stanford University, "A Combination of Centralized and Distributed Methods for Multi-Agent Planning and Scheduling", IEEE, pp. 488-493, 1990.
Editors: Jiming Liu and Ning Zhong, Intelligent Agent Technology, "Systems, Methodologies, and Tools", World Scientific Publishing Co. Pte. Ltd., pp. 306-316, Dated: 1999.

* cited by examiner

*Primary Examiner*—Greta L. Robinson
*Assistant Examiner*—Kuen S. Lu
(74) *Attorney, Agent, or Firm*—John R. Pivnichny; Hoffman, Warnick & D'Alessandro LLC

(57) ABSTRACT

A system, method and program product for centrally managing agents are provided. Specifically, under the present invention, master agents stored in a control database of a control system are scheduled to execute remote agents stored in remote databases of remote systems. Once executed by the master agents, the remote agents will implement functions thereto. By providing centralized management of agents in this manner, agent scheduling conflicts are prevented.

32 Claims, 4 Drawing Sheets

SYSTEM, METHOD AND PROGRAM PRODUCT FOR CENTRALLY MANAGING AGENTS

BACKGROUND OF THE INVENTION

1. Field of the Invention

The present invention generally relates to a system, method and program product for centrally managing agents. Specifically, the present invention allows master agents of a centralized control system to execute remote agents according to predefined scheduling, so as to avoid agent conflicts.

2. Background Art

In today's business world, businesses are increasingly implementing computer networks to foster growth. As such, many networks include one or more servers in communication with numerous clients. Moreover, these networks are often implemented as a local area network (LAN), wide area network (WAN), virtual private network (VPN) or the like. In general, computer systems implemented over a network commonly include agents. As known in the art, agents are programs that perform functions or services over a network according to defined scheduling. Under many network implementations, it is common for each computer system (e.g., server or client) to include one or more agents for performing a specific function.

Once type of function often performed by agents is data redundancy or processing. Specifically, business owners often desire that data stored within the network be copied or otherwise backed up to help minimize the loss of data in the event that a server or client fails. To this extent, if a business owner desires that data stored on a particular (source) server be replicated to another (destination) server, the source server will generally include a "replication" agent that will carry out the replication process.

Problems arise, however, as computer networks and the quantity of agents associated therewith begin to grow. Specifically, as more agents function, the potential for conflicts grows. For example, simultaneous execution of agents "A," "B" and "C" could cause serious performance degradation on a server. Moreover, executing an agent (e.g., a replication agent) during a period of high end-user use could cause a process (e.g., replication) to malfunction. In addition, a particular function could require a specific sequence of agents to be executed, which if not followed, could result in data integrity problems. The current disparate nature in which agents are controlled often gives rise to such conflict issues.

An additional problem with a high quantity of agents distributed across a growing network is the time and energy required to schedule the agents for execution. Specifically, agents are currently scheduled at a local level so that if server "A" is to be replicated to server "B," an administrator/programmer must access server "A" to schedule the replication agent. As the network begins to grow, local scheduling could place unreasonable strain on a business' resources.

In view of the forgoing, there exists a need for a system, method and program product for centrally managing agents. Specifically, there exists a need for a centralized "control" system having a database of master agents that are scheduled to execute remote agents residing on remote systems connected to the control system. A further need exists for the master agents to be able to communicate with the remote agents to implement functions corresponding to the remote agents and/or the remote databases. A need also exists for the master agents and/or the remote agents to be grouped for more controlled execution.

SUMMARY OF THE INVENTION

In general, the present invention provides a system, method and program product for centrally managing agents. Specifically, a central "control" system having a database of agents is provided. Connected to the control system are various remote systems, each having a remote database. The remote databases could each include any quantity (i.e., zero or more) of remote agents. The master agents are programmed and scheduled to communicate with the remote agents to implement various functions. Such functions include processing of data in the remote databases, and access control list (ACL) rule-based modification.

According to a first aspect of the present invention, a system for centrally managing agents is provided. The system comprises: (1) a control system having a control database; (2) a plurality of remote systems connected to the control system, wherein each of the plurality of remote systems has a remote database; and (3) a plurality of master agents in the control database, wherein the master agents are adapted to implement functions corresponding to the remote databases without causing agent scheduling conflicts.

According to a second aspect of the present invention, a system for centrally managing agents is provided. The system comprises: (1) a control system having a control database; (2) a plurality of remote systems connected to the control system, wherein each of the plurality of remote systems has a remote database that includes a remote agent; and (3) a plurality of master agents in the control database, wherein the master agents are scheduled to communicate with the remote agents to implement processing of data within the remote databases.

According to a third aspect of the present invention, a system for centrally managing agents is provided. The system comprises: (1) a control database having a plurality of master agents; (2) a scheduling system for scheduling the master agents to communicate with remote agents stored in remote databases to implement functions corresponding to the remote agents; and (3) a grouping system for grouping the master agents and the remote agents.

According to a fourth aspect of the present invention, a method for centrally managing agents is provided. The method comprises: (1) providing a control system having a control database of master agents; (2) providing a plurality of remote systems connected to the control system, wherein each remote system includes a remote database, and wherein each remote database includes a remote agent; and (3) scheduling the master agents to communicate with the remote agents to implement functions corresponding to the remote agents without causing agent scheduling conflicts.

According to a fifth aspect of the present invention, a program product stored on a recordable medium for scheduling master agents of a control system to communicate with remote agents of remote systems connected to the control system is provided. When executed, the program product comprises: (1) program code for scheduling the master agents to communicate with the remote agents to implement processing of data within remote databases; and (2) program code for grouping the master agents and the remote agents.

Therefore, the present invention provides a system, method and program product for managing agents.

BRIEF DESCRIPTION OF THE DRAWINGS

These and other features of this invention will be more readily understood from the following detailed description of the various aspects of the invention taken in conjunction with the accompanying drawings in which.

Figure 1:
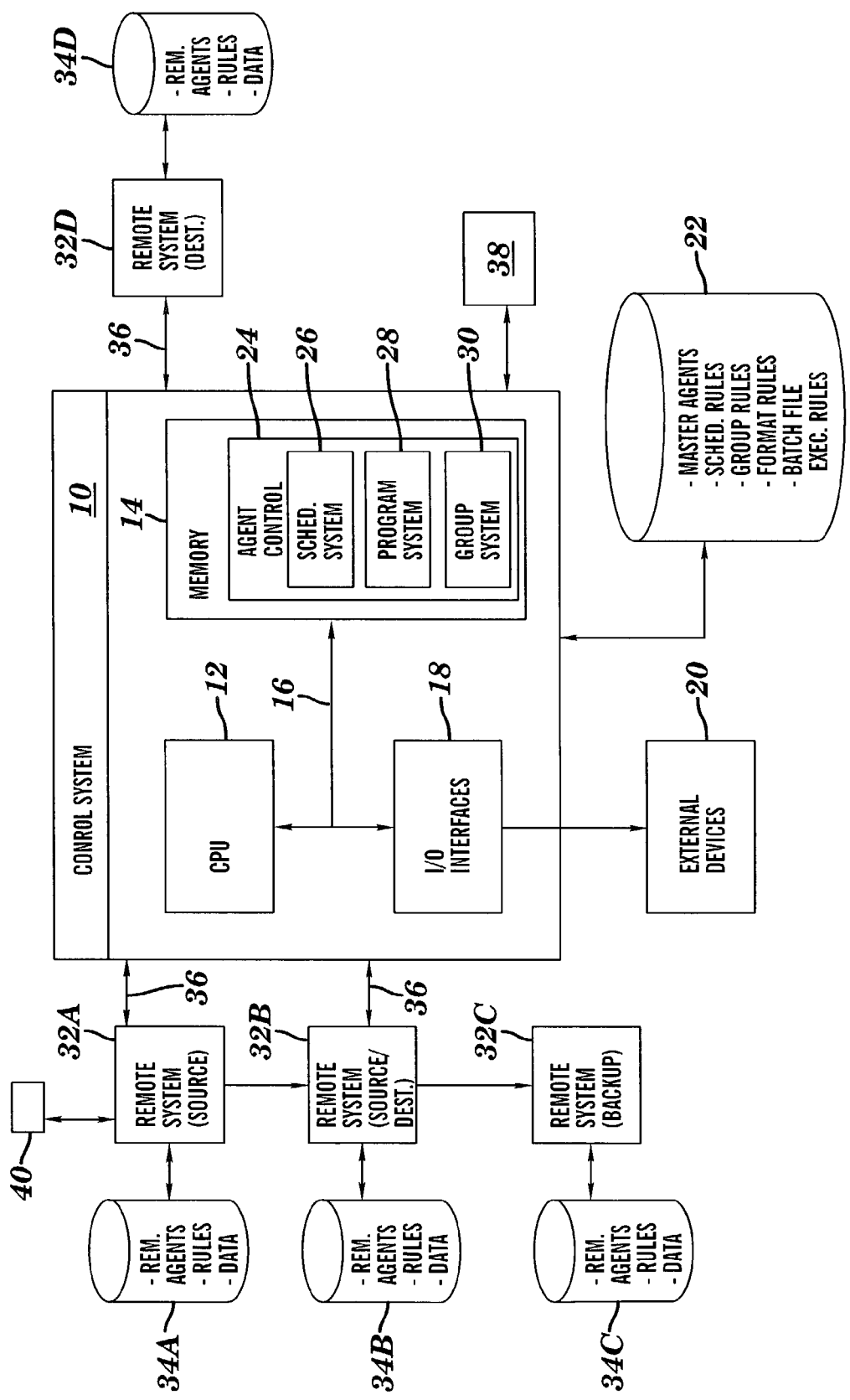
FIG. 1 depicts a computer system having an agent control system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a system, method and program product for centrally managing agents. Specifically, under the present invention, master agents stored in a control database of a control system will execute remote agents stored in remote databases of remote systems. Thus, the present invention provides a way for remotely stored agents to be centrally controlled. Such central control helps prevent, among other things, agent scheduling conflicts. In a typical embodiment, the present invention is useful in managing agents to implement functions such as data processing (e.g., data replication, data backup, etc.) and access control. However, it should be understood that the present invention could be utilized to implement any known function.

Referring now to FIG. 1, an exemplary embodiment of the present invention is shown. As depicted, control system 10 is connected to remote systems 32A–D. In a typical embodiment, control system 10 is a server or a devoted client that provides centralized management (i.e., scheduling and execution) of agents. As shown, control system 10 generally comprises central processing unit (CPU) 12, memory 14, bus 16, input/output (I/O) interfaces 18, external devices/resources 20 and control database 22. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in control system 10 and likewise may comprise any known type of transmission link, including electrical, optical, wireless, etc. In addition, although not shown, additional components, such as cache memory, communication systems, system software, etc., may be incorporated into control system 10.

Control database 22 may provide storage for information necessary to carry out the present invention. Such information could include, among other things, master agents, scheduling rules, grouping rules, formatting rules, batch file execution rules, etc. As such, control database 22 may include one or more storage devices, such as a magnetic disk drive or an optical disk drive. In another embodiment, control database 22 includes data distributed across, for example, a local area network (LAN), wide area network (WAN) or a storage area network (SAN) (not shown). Control database 22 may also be configured in such a way that one of ordinary skill in the art may interpret it to include one or more storage devices.

Communication between control system 10 and remote systems 32A–D occurs via communications links 36. Communications links 36 are intended to represent any possible method of communicating with control system 10. For example, communication could occur via a direct hardwired connection (e.g., serial port), or via an addressable connection (e.g., remotely) in a client-server (or server-server) environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server.

It should be understood, however, that irrespective of connection type, remote systems 32A–D could be either a server or a client. Moreover, it should be understood that remote systems 32A–D typically include computer components (e.g., CPU, memory, etc.) similar to control system 10. Such components have not been shown for brevity purposes. It should also be appreciated that although their contents may vary, remote databases 34A–D could be similar in structure/form to control database 22 as described above. In a typical embodiment, remote databases 34A–D could include data, rules and at least one remote agent. Although, it should be understood that some remote databases 34A–D may contain zero remote agents (e.g., if the remote database is intended to be a destination database). One type of rule that could reside in remote databases 34A–D are functional rules. That is, rules that govern the execution of the remote agents in the functions they perform. For example, if a remote agent in remote database 34A is a replication remote agent (i.e., an agent that replicates data from remote database 34A to a destination database), remote database 34A could include replication criteria rules that dictate how much of the data should be replicated. Thus, replication could be of all data in remote database 34A or of a subset/portion thereof. Other rules that could reside in remote databases 34A–D are access control list (ACL) rules. ACL rules govern the permission of an end-user for accessing a remote database 34A–D (or the data therein). For example, an ACL rule could dictate that end-user 40 can view, but not edit data in remote database 34A while replication is in progress. Thus, ACL rules can help maintain the integrity of the data.

Stored in memory 14 is agent control system 24. As depicted, agent control system includes scheduling system 26, programming system 28 and grouping system 30. Agent control system 24 allows remote agents stored in remote databases 34A–D to be managed from a central location, namely, control system 10. Specifically, under the present invention, master agents in control database 22 will be scheduled to communicate with and execute particular remote agents to perform various functions (e.g., replication, backup, etc.) that are programmed into the remote agents.

Under the present invention, typical functions that can be implemented by the remote agents via the master agents include, among other things, data processing of databases 34A–D and access control management. Examples of data processing functions that can be implemented under the present invention include cross-server replication of data, database backup, etc. Cross-server replication is when some or all data in a database is replicated to another database. Database backup is when a copy of data in a database is made to an alternate drive or destination system.

To schedule master agents to implement such functions, scheduling system 26 is used. For example, if the data in remote database 34A is desired to be replicated to database 34B (e.g., cross-server replication), a user/administrator 38 would schedule a "replication" master agent in control database 22. As known in the art, agents are programs that perform a specific function. For example, the replication master agent could be specifically programmed to communicate with, and execute, a specific replication remote agent in remote database 34A. Similarly, the specific replication remote agent could be specifically programmed to replicate some or all of the contents of database 34A to a particular destination, such as remote database 34B. The exact nature of the replication will depend on any replication criteria rules that are present in remote database 34A. For example, the replication criteria rules could dictate that only subset "A" of the data is to be replicated.

Under previous embodiments, no centralized control of remote agents (e.g., via control database 22 of scheduled master agents) was provided. Rather, each remote agent (such as the replication remote agent) had to be individually scheduled to perform its associated task. Thus, an administrator would have to access remote system 32A to instruct the replication remote agent when to replicate. Such an embodiment not only gives rise to the potential agent scheduling conflicts discussed above, but also makes altering the schedule of an agent extremely difficult. This is especially the case when several agents must execute in a particular sequence in order for a function to be properly completed. For example, rescheduling one agent could require rescheduling numerous agents on many disparate systems (e.g., remote systems 32A–D). To eliminate issues, scheduling system 26 is used to schedule the master agents in control database 22 to interact (e.g., communicate with and execute) with a specific remote agent (or group of remote agents). This interaction is referred to herein as a "call," meaning that the master agent will call the applicable remote agent and instruct the remote agent to perform its programmed function.

Figure 2:
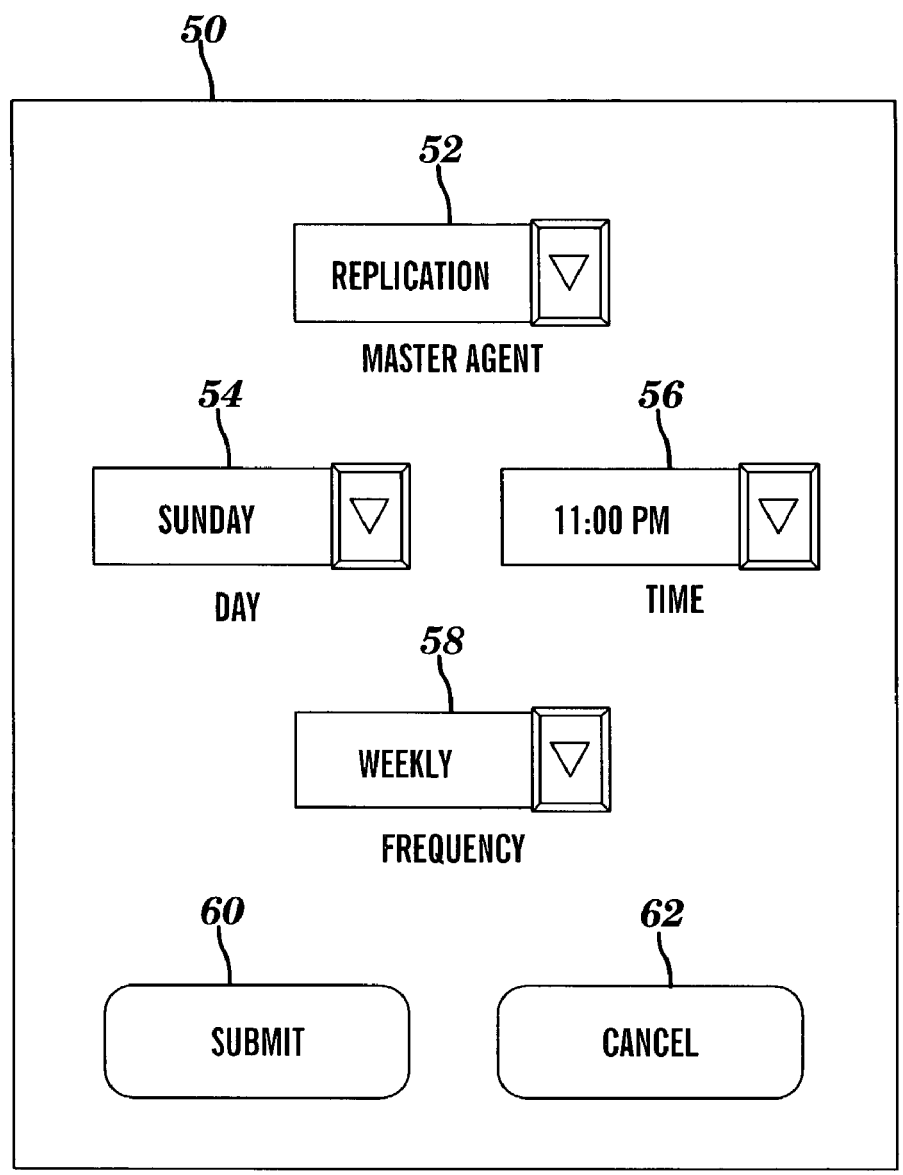
FIG. 2 depicts an exemplary user interface used for scheduling master agents according to the present invention.
Figure 3:
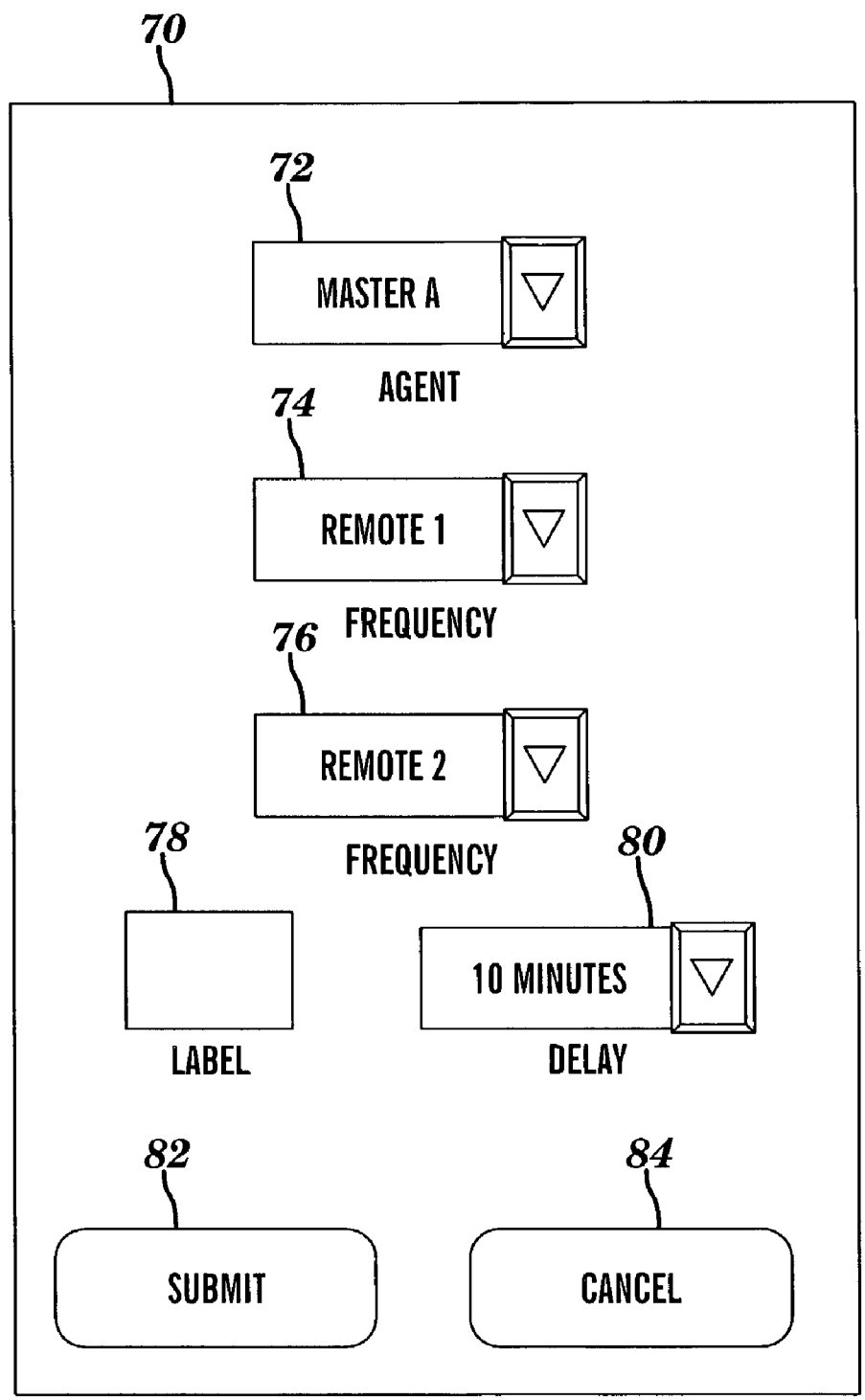
FIG. 3 depicts an exemplary user interface for grouping agents according to the present invention.

In a typical embodiment scheduling system 26 includes a user interface (e.g., web browser) that allows administrator 38 to define scheduling rules (i.e., schedule the master agents to execute). Referring now to FIG. 2, an exemplary interface 50 is shown. As depicted, interface 50 could include drop down menus 52, 54, 54 and 58 and buttons 60 and 62. Menu 52 could be used to select a particular master agent, while menus 54, 56 and 58 are used to schedule the selected master agent. For example, a replication master agent could be scheduled to execute weekly on Sunday night at 11:00 P.M. Buttons 60 and 62 could then be used to submit or cancel the selected schedule. If submitted, the replication master agent will "call" the replication remote agent every Sunday night at 11 P.M. As indicated above, the present invention can be used to implement any function that can be performed by a remote agent. Another example of a data processing function that can be implemented under the present invention is remote database backup. For example, remote database 34B could be backed up to remote database 34C, or to another drive of remote system 32B. In this case, menu 52 of interface 50 would be used to select a "backup" master agent. It should be understood, however, that in many cases a backup agent is not required to backup a database. Rather, commercial software applications such as ADSM from International Business Machines, Corp. of Armonk, N.Y. are available to automate the backup process. However, under certain conditions, such as when a database is in active use, applications such as ADSM may not function. Accordingly, backup agents can be provided to ensure that accurate backups are made. Similar to the replication master agent, the backup master agent is programmed to interact with one or more particular "backup" remote agents in a remote database (e.g., remote database 34B) to implement the backup. It should be understood that in using agents such to perform backups in this manner, it could also be necessary to provide format rules and/or a batch file to ensure that the backup is made in a workable format.

In addition to containing replication and backup master agents, control database 22 could also include ACL master agents to implement the addition or editing of ACL rules in a remote database. As indicated above, ACL rules control access to data by an end-user 40. For example, an ACL rule could prohibit the editing of data during replication or backup operations. To this extent, a specific ACL master agent could be provided and scheduled to add or edit ACL rules. LOTUS technology available from International Business Machines, Corp. of Armonk N.Y. For example, control database 22 is typically implemented as a LOTUS NOTES database. Moreover, the master agents are typically implemented as LOTUSCRIPT agents. To this extent, control database 22 typically includes a single view of a single "document." The single document will typically include a single form with a single field. The single field can be used to engage or disengage the present invention (i.e., the control of remote agents via master agents.) For example, if the field has a "Y," agent control system 24 is enabled and master agents will be scheduled and executed to call the remote agents. Conversely, if the field has an "N," agent control system 24 is disengaged and the remote agents are individually scheduled and executed. It should be appreciated, however, that the present invention can be implemented using any known technology and, accordingly, is not limited to a specific technology.

Figure 4:
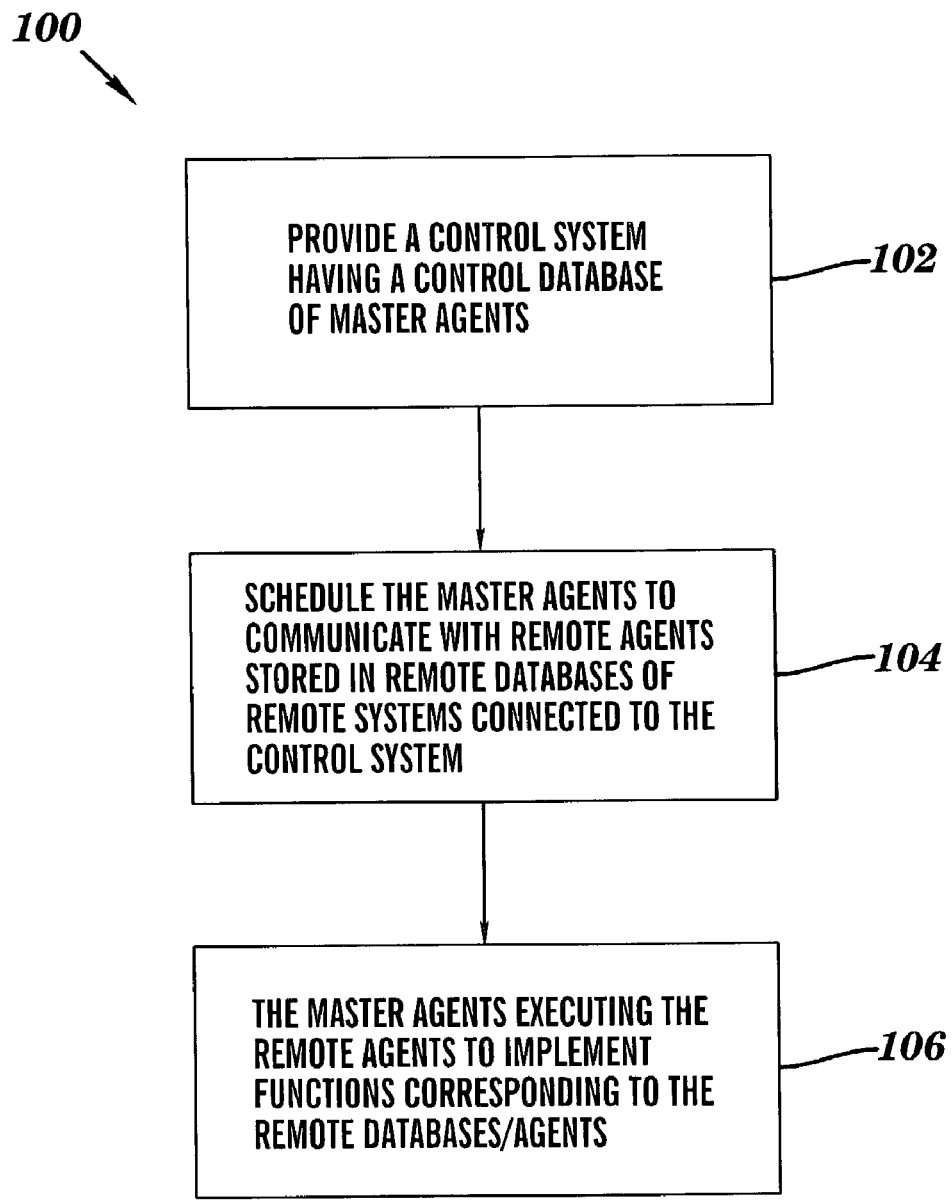
FIG. 4 depicts a method flow diagram according to the present invention.

Referring now to FIG. 4, a method flow chart 100 according to the present invention is shown. As depicted, first step 102 in method 100 is to provide a control system having a control database of master agents. As indicated above, the master agents could be previously provided, or created/edited with programming system. The next step 104 is to schedule the master agents to communicate with remote agents stored in remote databases of remote systems connected to the control system. Finally, the master agents will execute the remote agents to implement functions corresponding to the remote agents and/or remote databases in step 106. As indicated above, such functions could include, among other things, data processing, access control, etc. By centrally managing agents in this manner, the present invention allows functions corresponding to remote agents and/or remote databases to be implemented without the agent scheduling conflicts that arose under previous embodiments.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for centrally managing agents, comprising:
 a control system having a control database;
 a plurality of remote systems connected to the control system, wherein each of the plurality of remote systems has a remote database; and
 a plurality of master agents in the control database, each of the plurality of master agents being programmed to perform an agent function, wherein the plurality of master agents are adapted to control local functions of the remote databases corresponding to the agent function of each of the plurality of master agents and to help prevent agent scheduling conflicts, and wherein the plurality of master agents are adapted to implement any local function of the remote database that may be performed by an agent of the remote database.

2. The system of claim 1, wherein the remote database include remote agents, each remote agent having a remote agent function, and wherein the plurality of master agents are adapted to centrally manage the remote agents by interacting with the remote agents that have remote agent functions corresponding to the agent functions of the plurality of master agents according to predefined scheduling to control the local functions.

3. The system of claim 2, wherein the control system further comprises:
 a scheduling system for scheduling implementation of the local functions by adapting the master agents to interact with the remote agents according to the predefined scheduling; and
 a grouping system for grouping the master agents and the remote agents.

4. The system of claim 2, wherein the master agents are adapted to modify access control list rules to control access to the data within the remote databases.

5. The system of claim 1, wherein at least one of the local functions comprises cross-system replication of at least a portion of the data within one of the remote databases.

6. The system of claim 1, wherein at least one of the local functions comprises backing up the data within one of the remote databases.

7. The system of claim 1, wherein the control system is selected from the group consisting of a server and a devoted client.

8. A system for centrally managing agents, comprising:
 a control system having a control database;
 a plurality of remote systems connected to the control system wherein each of the plurality of remote systems has a remote database that includes a remote agent having a remote agent function; and
 a plurality of master agents in the control database, each of the plurality of master agents being programmed to perform an agent function, wherein the plurality of master agents are scheduled to centrally manage the remote agents that have remote agent functions corresponding to the agent functions of the plurality of master agents to control local processing of data within the remote databases, and wherein the plurality of master agents are adapted to implement any local function of the remote database that may be performed by a remote agent of the remote database.

9. The system of claim 8, wherein the control system comprises:
 a scheduling system for scheduling the local processing of data within the remote databases by adapting the master agents to interact with the remote agents; and
 a grouping system for grouping the master agents and the remote agents.

10. The system of claim 9, wherein the grouping system allows a plurality of remote agents to be called by a single master agent.

11. The system of claim 8, wherein the master agents are further scheduled to modify access control list rules to control access to the data within the remote databases.

12. The system of claim 8, wherein the processing of data comprises cross-system replication of at least a portion of the data within one of the remote databases.

13. The system of claim 8, wherein the processing of data comprises backing up the data within one of the remote databases.

14. The system of claim 8, wherein the control system is selected from the group consisting of a server and a devoted client.

15. A system for centrally managing agents, comprising:
 a control database having a plurality of master agents, each of the plurality of master agents being programmed to perform an agent function;
 a scheduling system for scheduling the master agents to centrally manage remote agents, each remote agent having a remote agent function, the remote agents stored in remote databases to implement local functions of the remote databases corresponding to the remote agents that have remote agent functions corresponding to the agent functions of the plurality of master agents; and
 a grouping system for grouping the plurality of master agents and the remote agents,
 wherein the plurality of master agents are adapted to implement any local function of a remote database that may be performed by an agent of the remote database.

16. The system of claim 15, further comprising an agent programming system for programming the master agents to manage particular remote agents.

17. The system of claim 15, wherein the master agents are scheduled to modify access control list rules to control access to the data within the remote databases.

18. The system of claim 15, wherein at least one of the local functions comprises cross-system replication of at least a portion of the data within one of the remote databases.

19. The system of claim 15, wherein at least one of the local functions comprises backing up the data within one of the remote databases.

20. A method for centrally managing agents, comprising:
 providing a control system having a control database of master agents, each of the master agents being programmed to perform an agent function;
 providing a plurality of remote systems connected to the control system, wherein each remote system includes a remote database, and wherein each remote database includes a remote agent, each remote agent having a remote agent function; and
 scheduling the master agents to centrally manage the remote agents that have remote agent functions corresponding to the agent functions of the master agents to control local functions of the remote system corresponding to the remote agents and to help prevent agent scheduling conflicts,
wherein the master agents are adapted to implement any local function of the remote database that may performed by a remote agent of the remote database.

21. The method of claim 20, further comprising grouping the master agents and the remote agents.

22. The method of claim 20, further comprising programming the master agents to manage particular remote agents.

23. The method of claim 20, wherein the scheduling step comprises scheduling the master agents to modify access control list rules to control access to the data stored within in the remote databases.

24. The method of claim 20, wherein at least one of the local functions comprises cross-system replication of at least a portion of the data within one of the remote databases.

25. The method of claim 20, wherein at least one of the local functions comprises backing up the data within one of the remote databases.

26. A program product stored on a recordable medium for scheduling master agents of a control system, each of the master agents being programmed to perform an agent function, to communicate with remote agents of remote system connected to the control system, each remote agent having a remote function, which when executed, comprises:
program code for scheduling the master agents to centrally manage the remote agents that have remote agent functions corresponding to the agent functions of the master agents to control local processing of data within remote databases; and
program code for grouping the master agents and the remote agents,
wherein the master agents are adapted to implement any local processing within a remote database that maybe performed by an agent of the remote database.

27. The program product of claim 26, further comprising program code for programming the master agents to manage particular remote agents.

28. The program product of claim 26, further comprising program code for scheduling the master agents to modify access control list rules to control access to the data within the remote databases.

29. The program product of claim 26, wherein the processing of data comprises cross-system replication of at least a portion of the data within one of the remote databases.

30. The program product of claim 26, wherein the processing of data comprises backing up the data within one of the remote databases.

31. A system for implementing a function on a remote machine, the system comprising:
at least one remote computer system;
a remote database on each remote computer system for storing remote information, the remote information including:
at least one remote agent, each remote agent being a program that performs a remote function on the remote computer system according to defined scheduling; and
remote data;
a control computer system connected to each of the at least one remote computer system;
a control database implemented on the control computer system, the control database for storing control information, the control information including:
a master agent, the master agent being a program that performs a specific function; and
a grouping rule for grouping the master agent with at least one corresponding remote agent;
an agent control system that allows the at least one corresponding remote agent of the remote database to be centrally managed from the control computer system, the agent control system including:
a grouping system that includes a grouping graphical user interface (GUI) to group in accordance with the grouping rule the master agent with the at least one corresponding remote agent, the master agent adapted to communicate with and execute the at least one corresponding remote agent to perform the remote function programmed into the at least one corresponding remote agent that corresponds to the specific function performed by the master agent;
wherein the control computer system may use the master agent to call the at least one corresponding remote agent to implement any function that can be performed by a remote agent,
and wherein the agent control system helps to prevent conflicts in agent scheduling.

32. The system of claim 31, the system fwther comprising:
remote functional rules included in the remote information that govern execution of the at least one remote agent in the remote function performed by the at least one remote agent;
remote access control list (ACL) rules included in the remote information that govern a permission of an end-user for accessing the remote database to help maintain an integrity of the remote data;
a scheduling rule included in the control information for scheduling execution of the master agent;
a formatting rule included in the control information for governing execution of the master agent;
a scheduling system included in the access control system that includes a scheduling graphical user interface (GUI) to schedule the master agent to communicate with and execute the at least one corresponding remote agent in accordance with the scheduling rule; and
a programming system included in the access control system that includes a programming graphical user interface (GUI) to define in accordance with the formatting rule of the control database at least one of the remote functional rules;
wherein the remote function includes replicating at least some of the remote data in the remote database to a second remote database, backing up a copy of the remote data in the remote database to an alternate destination system, adding to the remote ACL rules, and editing the ACL rules.

* * * * *